United States Patent
Ogane

(10) Patent No.: US 10,364,371 B2
(45) Date of Patent: Jul. 30, 2019

(54) ANTIREFLECTION FILM, OPTICAL MEMBER, AND METHOD OF PRODUCING OPTICAL MEMBER

(71) Applicant: CANON KABUSHIKI KAISHA, Tokyo (JP)

(72) Inventor: Masanobu Ogane, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 16 days.

(21) Appl. No.: 15/882,729

(22) Filed: Jan. 29, 2018

(65) Prior Publication Data
US 2018/0148603 A1 May 31, 2018

Related U.S. Application Data

(63) Continuation of application No. 14/657,456, filed on Mar. 13, 2015, now Pat. No. 9,914,850.

(30) Foreign Application Priority Data

Mar. 14, 2014 (JP) .................. 2014-052323

(51) Int. Cl.
| | |
|---|---|
| *C09D 183/04* | (2006.01) |
| *G02B 1/11* | (2015.01) |
| *C09D 171/00* | (2006.01) |
| *C03C 17/00* | (2006.01) |
| *C09D 5/00* | (2006.01) |
| *C08L 83/04* | (2006.01) |
| *G02B 1/111* | (2015.01) |
| *G02B 27/00* | (2006.01) |
| *C03C 17/34* | (2006.01) |

(Continued)

(52) U.S. Cl.
CPC .......... *C09D 183/04* (2013.01); *C03C 17/007* (2013.01); *C03C 17/34* (2013.01); *C08G 65/007* (2013.01); *C08L 83/04* (2013.01); *C09D 5/006* (2013.01); *C09D 171/00* (2013.01); *G02B 1/11* (2013.01); *G02B 1/111* (2013.01); *G02B 27/0006* (2013.01); *C03C 2217/445* (2013.01); *C03C 2217/465* (2013.01); *C03C 2217/478* (2013.01); *C03C 2217/73* (2013.01); *C03C 2217/732* (2013.01); *C08G 2650/48* (2013.01); *C08K 7/26* (2013.01)

(58) Field of Classification Search
CPC .. C09D 183/04; C09D 171/00; C03C 17/007; C08L 83/04; G02B 1/11; G02B 1/111; G02B 27/0006; C08K 7/26
USPC .......................................... 359/601
See application file for complete search history.

(56) References Cited

U.S. PATENT DOCUMENTS

| | | | |
|---|---|---|---|
| 8,691,351 B2 * | 4/2014 | Asakura .................. | G02B 1/111 359/586 |
| 2009/0232977 A1 * | 9/2009 | Morinaga .................. | C08J 7/02 427/162 |

(Continued)

FOREIGN PATENT DOCUMENTS

EP 2679645 A1 1/2014

*Primary Examiner* — Collin X Beatty
*Assistant Examiner* — Grant A Gagnon
(74) *Attorney, Agent, or Firm* — Canon U.S.A. Inc., IP Division

(57) ABSTRACT

An antireflection film includes a first layer including hollow particles. The first layer includes the hollow particles, a binder, and a fluorine compound; has a refractive index of 1.22 to 1.30; and has a contact angle between the surface thereof and n-hexadecane of 50° to 70°.

32 Claims, 2 Drawing Sheets

(51) Int. Cl.
*C08G 65/00* (2006.01)
*C08K 7/26* (2006.01)

(56) References Cited

U.S. PATENT DOCUMENTS

| | | | |
|---|---|---|---|
| 2009/0267270 A1 | 10/2009 | Murakami | |
| 2011/0200826 A1* | 8/2011 | Wilczek | C09D 183/08 428/412 |
| 2012/0162774 A1* | 6/2012 | Ishida | G02B 1/111 359/601 |
| 2013/0034711 A1* | 2/2013 | Amano | G02B 1/118 428/216 |
| 2013/0222916 A1 | 8/2013 | Ogane | |
| 2015/0225569 A1* | 8/2015 | Kameno | C01F 5/28 106/409 |

* cited by examiner

ANTIREFLECTION FILM, OPTICAL MEMBER, AND METHOD OF PRODUCING OPTICAL MEMBER

CROSS-REFERENCE TO RELATED APPLICATIONS

This application is a continuation of U.S. application Ser. No. 14/657,456, filed Mar. 13, 2015, which claims the benefit of Japanese Patent Application No. 2014-052323, filed Mar. 14, 2014, each of which is hereby incorporated by reference herein in their entirety.

BACKGROUND OF THE INVENTION

Field of the Invention

The present invention relates to an antireflection film and an optical member, having excellent oil contamination resistance, and relates to a method of producing an optical member.

Description of the Related Art

In order to prevent the reflection of light at incident or emitting surfaces of optical members, antireflection films each having a thickness of several tens to several hundred nanometers and being composed of a plurality of monolayer or multilayer optical films having different refractive indices have been used. These antireflection films are produced by a vacuum deposition process, such as vapor deposition or sputtering, or a wet film-formation process, such as dip coating or spin coating.

The outermost layer of such an antireflection film is made of a transparent material having a low refractive index, i.e., an inorganic material, such as silica, magnesium fluoride, or calcium fluoride, or an organic material, such as a silicone resin or an amorphous fluororesin.

In order to further reduce the reflectivity, a low refraction film utilizing the fact that air has a refractive index of 1.0 has been recently used as the antireflection film. The refractive index is reduced by forming voids in a layer of silica or magnesium fluoride. For example, the refractive index of a magnesium fluoride thin film can be reduced from 1.38 to 1.27 by forming 30 vol % of voids in the thin film.

The voids can be formed by, for example, utilizing hollow silica particles. An antireflection film having a low refractive index is prepared by using the hollow silica particles. (Japanese Patent Laid-Open No. 2001-233611).

Alternatively, an antireflection film having a low refractive index can be prepared by forming voids between fine particles. This process, however, has a risk of invasion of contamination into the voids between the fine particles. If the contamination is oily matter, the contaminants are hardly removed, resulting in a reduction in the antireflection performance (Japanese Patent Laid-Open No. 2004-258267).

Although the removal of the oily matter from the antireflection film is took into account in the process described in Japanese Patent Laid-Open No. 2004-258267, the diffusion of the oily matter is not took into account. In the process described in Japanese Patent Laid-Open No. 2004-258267, in order to enhance the removal of oily matter, a coating solution prepared by adding an oil repellent component to a binder coating solution is given to the voids between particles. In the finally resulting layer, the binder component consequently contains a fluorine component, resulting in that a high oil repellent property is not expressed.

In addition, in the antireflection film described in Japanese Patent Laid-Open No. 2004-258267, since the fluorine component is added to the binder coating solution, an increase in the amount of fluorine for obtaining an oil repellent property reduces the strength of the film.

SUMMARY OF THE INVENTION

A low-refractive-index layer utilizing gaps between particles has a problem that oily matter penetrates and diffuses into voids between particles in the film. The present inventor has found that the contamination that has not been visually recognized at the time of adhesion of the contamination and low-molecular-weight oily matter generated by the adhesion of contaminants diffuse among particles in the low-refractive-index layer to decrease the refractive index, resulting in deterioration in the appearance to a degree that can be visually recognized.

Aspects of the present invention provide an antireflection film including a low-refractive-index layer, having an effect of preventing oily matter in the low-refractive-index layer from diffusing.

Aspects of the present invention further provide an optical member including the antireflection film.

Aspects of the present invention further provide a method of producing the optical member.

Aspects of the present invention relate to an antireflection film including a first layer including hollow particles. The first layer includes the hollow particles, a binder, and a fluorine compound; has a refractive index of 1.22 to 1.30; and has a contact angle between the surface thereof and n-hexadecane of 50° to 70°.

Aspects of the present invention relate to an optical member including a substrate and an antireflection film on the substrate. The antireflection film includes a first layer including hollow particles. The first layer includes the hollow particles, a binder, and a fluorine compound; has a refractive index of 1.22 to 1.30; and has a contact angle between the surface thereof and n-hexadecane of 50° to 70°.

Aspects of the present invention relate to a method of producing an optical member including a substrate and an antireflection film on the substrate. The method includes a first coating step of applying a first coating solution dispersing hollow particles to the substrate; a first drying step of drying the resulting coating film of the first coating solution to form a hollow particle layer having gaps between the hollow particles; a second coating step of applying a second coating solution containing a binder or a component for generating a binder to the hollow particle layer; a second drying step of drying the resulting coating film of the second coating solution to form a precursor layer including the binder intervening in the gaps between the hollow particles; a third coating step of applying a third coating solution containing a fluorine compound to the precursor layer; and a forming step of drying the resulting coating film of the third coating solution and giving the fluorine compound to the precursor layer to form an antireflection film.

Further features of the present invention will become apparent from the following description of exemplary embodiments with reference to the attached drawings.

DESCRIPTION OF THE EMBODIMENTS

Embodiments of the present invention will now be described in detail with reference to the drawings.

Optical Member

Figure 1:
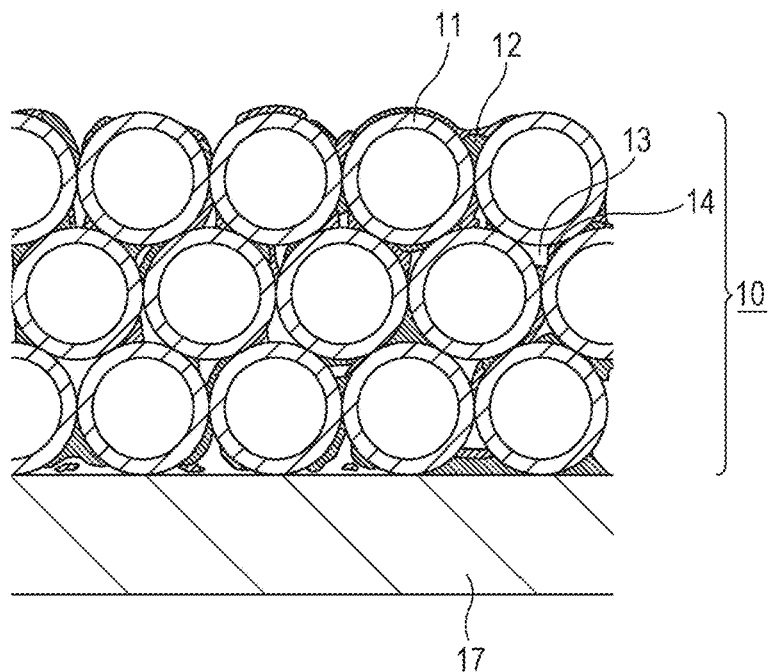
FIG. 1 is a schematic diagram illustrating an embodiment of the optical member of the present invention.

FIG. 1 is a schematic diagram illustrating an embodiment of the optical member of the present invention.

The optical member according to an aspect of the present invention includes a substrate 17 and an antireflection film including a first layer 10. The first layer 10 of the antireflection film at least includes hollow particles 11, a binder 12, and a fluorine compound 14.

Figure 2:
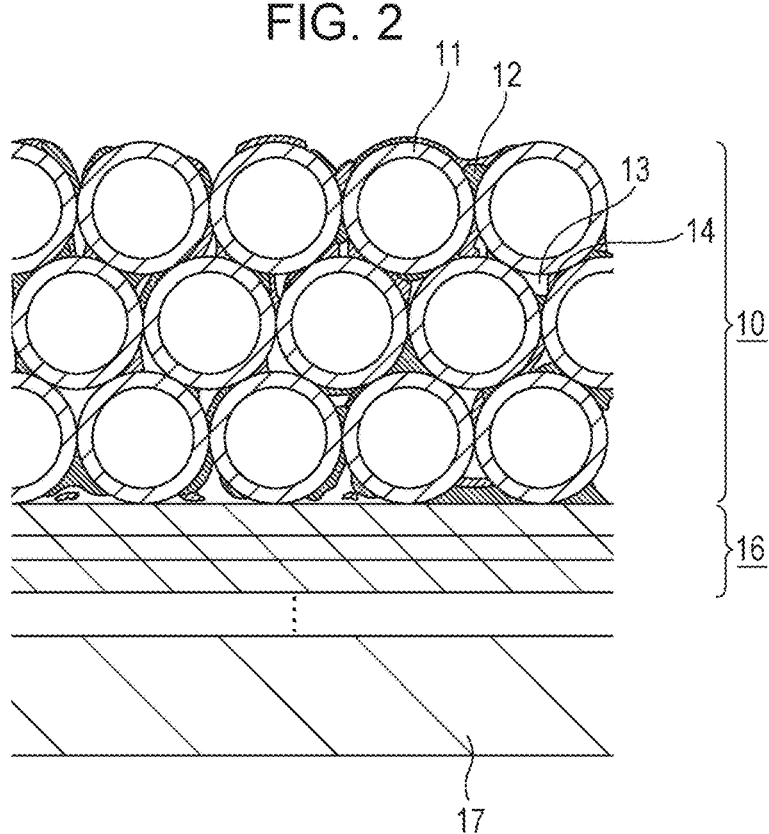
FIG. 2 is a schematic diagram illustrating an embodiment of the optical member of the present invention.

In FIG. 1, the optical member of the present invention includes an antireflection film including hollow particles 11 bound to one another with the binder 12 on a substrate 17. The first layer 10 of the antireflection film has voids 13 between the hollow particles 11. In addition, the fluorine compound 14 is given to the gaps between the hollow particles 11. FIG. 2 shows an antireflection film including an oxide layer 16 between a substrate 17 and a first layer 10. The oxide layer 16 can include silicon oxide or a metal oxide. In addition, the oxide layer 16 can be composed of alternately laminated layers having a high refractive index and a low refractive index. Such an oxide layer has low reflectivity.

Antireflection Film

In the first layer including the hollow particles, the hollow particles may be stacked in a plurality of tiers. In such a case, the hollow particles at the surface should be arranged along the surface of the substrate. For example, the hollow particles should be arranged on a plane parallel to the surface of the substrate. The state of the hollow particles arranged on a plane parallel to the surface of the substrate refers to a state that the distance of each of the hollow particles arranged at the surface of the antireflection film from the plane parallel to the surface of the substrate is within the radius of the hollow particle. Alternatively, the state refers to a state that excluding local gaps, the distances of each of the hollow particles from adjacent hollow particles in the direction along the surface of the substrate are within the radium of the hollow particle.

Whether or not hollow particles are arranged on a plane parallel to the surface of the substrate can be judged by observing a cross section of the antireflection film in the direction parallel to the normal line of the surface of the substrate. For example, a reflection electron microscopic image of a cross section of the antireflection film in the direction parallel to the normal line of the surface of the substrate is observed through image processing. The image processing can be performed with commercially available image processing software, such as image Pro PLUS (manufactured by Media Cybernetics).

If hollow particles at the surface are arranged on a plane parallel to the surface of the substrate, the heights of the hollow particles from the plane parallel to the surface of the substrate are the same. Accordingly, the spheres of the hollow particles can be verified by observing the surface of the antireflection film from the direction of the normal line of the substrate with a reflection electron microscope. In a state that the hollow particles at the surface are arranged on a plane parallel to the surface of the substrate, gaps having small and uniform sizes are evenly distributed among the hollow particles. As a result, scattering is prevented.

The hollow particles can be arranged in the antireflection film of the present invention at a two-dimensional density of 0.80 or more and 0.88 or less. The term "two-dimensional density" refers to the area ratio of the hollow particles to the total surface. The area ratio can be measured by processing a reflection electron microscopic image of a cross section of the antireflection film in the direction parallel to the normal line of the surface of the substrate. The image processing can be performed with commercially available image processing software, such as image Pro PLUS (manufactured by Media Cybernetics). The area ratio can be determined in a predetermined image region by optionally adjusting the contrast to an appropriate level, measuring the area of hollow particles through measurement of each hollow particle, and calculating the ratio of the area of the particles to the area of the predetermined image region. This two-dimensional density defines the state of arrangement of the hollow particles. A higher density means a state that a larger number of the hollow particles are arranged. As a result, the gaps between the hollow particles become smaller. The two-dimensional density when the hollow particles are true spheres and are arranged at the highest density is hexagonally packed arrangement having a two-dimensional density of about 0.90.

The density, i.e., the arrangement property, varies mainly depending on the dispersion state of the hollow particles. When the hollow particles are uniformly dispersed in a medium, the hollow particles are easily arranged. If the arrangement property is deteriorated, the spaces between the hollow particles are enlarged, resulting in enlargement of the gaps. Large gaps having a two-dimensional density of less than 0.8, consequently, occur to increase the scattering of visible light. Accordingly, the two-dimensional density should be controlled to be 0.8 or more. Although a higher arrangement property of the hollow particles is preferred, it is substantially difficult to produce an antireflection film having an arrangement property showing a two-dimensional density of 0.88 or more.

The hollow particle 11 has a hollow space (vacancy) therein and a shell 15 surrounding the hollow space (vacancy). The air (refractive index: 1.0) contained in the hollow space (vacancy) reduces the refractive index of the antireflection film. The vacancy may be monoporous or multiporous, which can be appropriately selected. The material constituting the hollow particles can have a low refractive index, and examples thereof include inorganic materials, such as $SiO_2$, $MgF_2$, and fluorine; and organic polymers, such as silicone. Among these materials, $SiO_2$ and $MgF_2$, in particular, $SiO_2$ can be used. The hollow particles can be easily produced from $SiO_2$ by, for example, the method described in Japanese Patent Laid-Open No. 2001-233611 or 2008-139581. The hollow particles can reduce the refractive index of the antireflection film.

The hollow particles 11 can have an average particle diameter of 15 nm or more and 100 nm or less, in particular, 15 nm or more and 60 nm or less. If the average particle diameter of the hollow particles is less than 15 nm, it is difficult to stably form particles serving as cores. In contrast, an average particle diameter of higher than 100 nm increases the sizes of the gaps between the hollow particles to easily cause large voids and causes scattering due to the increase in size of the hollow particles.

The term "average particle diameter of hollow particles" refers to an average Feret's diameter. The average Feret's diameter can be measured by processing a transmission electron microscopic image. The image processing can be performed with commercially available image processing software, such as image Pro PLUS (manufactured by Media Cybernetics). The average particle diameter can be determined in a predetermined image region by optionally adjusting the contrast to an appropriate level, measuring the Feret's diameter of each hollow particle, and calculating the average of the Feret's diameters.

The shell 15 of the hollow particle can have a thickness of 10% or more and 50% or less, in particular, 20% or more and 35% or less, of the average particle diameter. If the thickness of the shell is less than 10% of the average particle diameter, the strength of the hollow particles is insufficient. If the thickness is higher than 50%, the effect of the hollow particles is not significantly expressed in the refractive index.

The content of the hollow particles contained in the first layer of the present invention can be 50% by mass or more and 85% by mass or less, in particular, 75% by mass or more and 85% by mass or less, based on the mass of the antireflection film.

The binder used in the present invention can be appropriately selected depending on the abrasion resistance, adhesion, and environmental reliability of the film. The binder can be, for example, an alkoxysilane hydrolysis-condensation product. The alkoxysilane hydrolysis-condensation product can have a weight-average molecular weight of 1000 or more and 3000 or less in terms of polystyrene. If the alkoxysilane hydrolysis-condensation product has a weight-average molecular weight of less than 1000, cracking readily occurs after hardening, and stability as a coating solution decreases. A weight-average molecular weight of higher than 3000 increases the viscosity, which readily causes ununiform voids in the binder and thereby readily causes large voids.

The content of the binder contained in the first layer including hollow particles can be 15% by mass or more and 50% by mass or less, in particular, 15% by mass or more and 25% by mass or less, based on the mass of the antireflection film.

The binder in the hollow particle layer of the present invention possesses a plurality of voids therein. The state that the binder possesses voids therein means that the binder itself has gaps, i.e., the binder has voids 13, separately from the vacancies of the hollow particles 11. The refractive index of the antireflection film can be further reduced by the gaps possessed by the binder separately from the vacancies of the hollow particles.

In the present invention, a fluorine compound 14 is given on the surfaces defining the gaps, the voids 13. An antireflection film including a first layer including hollow particles utilizing gaps between hollow particles has a problem that if a material such as oil adheres to the first layer including hollow particles and does not including a fluorine compound, the material such as oil penetrates and diffuses, like a capillary action, into voids between the hollow particles in the film. The contamination that has not been visually recognized at the time of adhesion of the contamination and low-molecular-weight oily matter contained in contaminants, by a long contact time of the contaminants, diffuse between the hollow particles in the low-refractive-index layer to decrease the refractive index, resulting in deterioration in the appearance to a degree that can be visually recognized. The fluorine compound 14 given on the surfaces defining the gaps, voids 13, can inhibit the penetration and diffusion of the low-molecular-weight oily matter by the oil repellent property of the fluorine compound.

The first layer including hollow particles can have a refractive index of 1.22 to 1.30.

The first layer including hollow particles can have a contact angle between the surface thereof and n-hexadecane of 50° to 70°, in particular, 60° to 70°. The n-hexadecane contact angle can be measured by a θ/2 method by dropping 10 μL of n-hexadecane onto the surface of the antireflection film. If the n-hexadecane contact angle is smaller than 50°, the effect of preventing diffusion of oil is low.

The first layer including hollow particles can have a contact angle between the surface thereof and water of 80° to 120°, in particular, 80° to 110°.

The refractive index ratio of the fluorine compound contained in the first layer including hollow particles of the antireflection film of the present invention to the whole first layer including hollow particles can be 0.0075 or more and 0.02 or less, in particular, 0.01 or more and 0.02 or less. In order to achieve an oil repellent property showing a contact angle with n-hexadecane of 50° or more, it is necessary to give a fluorine compound to the surfaces defining the voids. If the amount of the given fluorine compound is small, a desired contact angle with n-hexadecane cannot be obtained due to the influence of the contact angle between the hollow particle and the surface of the binder. A refractive index ratio of less than 0.0075 disadvantageously results in a contact angle of smaller than 50°. A refractive index ratio of 0.02 or more is sufficient for the contact angle with n-hexadecane, but disadvantageously provides a low refractive index.

In the present invention, the fluorine compound given on the surfaces defining the gaps, the voids 13, can be a perfluoropolyether-containing compound, polytetrafluoroethylene (Teflon (registered trademark)). Since the fluorine compound is a polymer, easily forms layers on the surfaces defining voids, and readily has a film thickness for providing a necessary contact angle, a desired contact angle with n-hexadecane can be achieved with a smaller ratio. Since the fluorine compound has a low refractive index, it can provide a desired contact angle, with a smaller ratio, to the whole first layer including hollow particles and an effect due to an increase in the refractive index.

In the present invention, the binder may have voids having a cross-sectional area of less than 1000 $nm^2$ and voids having a cross-section area of 1000 $nm^2$ or more. The number of the voids having a cross-sectional area of 1000 $nm^2$ or more contained in the binder can be ten or less per square micrometers of the cross-sectional area of the binder. That is, many of the voids contained in the binder should have a cross-sectional area of less than 1000 $nm^2$.

The voids in the binder occur when the volume of the binder is smaller than the volume of gaps between the hollow particles constituting the first layer including the hollow particles. Occurrence of such voids can be controlled by adjusting the ratio of the hollow particles contained in the coating solution for forming a film to the binder. The binder is, however, easily unevenly distributed with a decrease in the amount of the binder contained in the coating solution and an increase in the volume of the gaps between the hollow particles, resulting in unevenness in size of the voids. Although such an ununiform state is not a problem in common hollow particles, in hollow particles having thin walls due to the vacancies, the voids and the vacancies of the hollow particles are detected by light as large voids due to the effective medium approximation of refractive indices. Consequently, the void sizes become uneven, and voids having cross-sectional area of 1000 $nm^2$ or more occur. Since an increase in the number of such voids increases scattering of visible light, the number of voids having a cross-sectional area of 1000 nm² or more should be controlled to be ten or less per square micrometers and further to be zero.

The total content of the voids possessed by the first layer including hollow particles of the present invention can be 5 vol % or more and 25 vol % or less, in particular, 10 vol % or more and 20 vol % or less, based on the volume of the first layer including hollow particles.

The thickness d of the first layer including hollow particles of the present invention can be in the following range:

$$\frac{2}{5} \cdot 2a + a \cdot n \cdot \sqrt{\frac{8}{3}} \leq d \leq \frac{4}{5} \cdot 2a + a \cdot n \cdot \sqrt{\frac{8}{3}} \quad \text{(Expression 1)}$$

where, a represents the average particle radius of the hollow particles; and n represents a positive integer.

The first layer including hollow particles of the present invention is formed by hollow particles and a binder separately. The number of voids having a cross-sectional area of 1000 nm² or more is small after the film formation from a first coating solution containing the hollow particles and a solvent. Voids of having a cross-sectional area of 1000 nm² or more, however, occur when a second coating solution containing the binder and a solvent is applied to the substrate provided with the film of the hollow particles. The mechanism of the occurrence of voids may be that the hollow particles forming the film move again into the solvent containing the binder to cause occurrence of voids or that the hollow particles aggregate associated with drying shrinkage of the binder. The occurrence of the voids having a cross-sectional area of 1000 nm² or more causes scattering. The present inventors have diligently studied and, as a result, have found that the occurrence of voids can be reduced by increasing the density of the hollow particles and preventing the particles from moving.

In the first layer including hollow particles of the present invention, it is conjectured that the hollow particles are arranged in a hexagonal close-packed pattern and that the film thickness is controlled by the density of the hollow particles and the number of tiers of the hollow particles. In the hollow particles packed in a hexagonal closed-packed pattern, the hollow particles are packed in a film thickness period of which each tier has a thickness:

$$a \cdot \sqrt{\frac{8}{3}} \cdot \quad \text{(Expression 2)}$$

Since the hollow particles in the first tier are spherical, the optically effective film thickness is experimentally about 3/5a, and the thickness of the second and subsequent films of the most densely stacked hollow particles is:

$$\frac{3}{5} \cdot 2a + a \cdot n \cdot \sqrt{\frac{8}{3}} \quad \text{(Expression 3)}$$

where, n represents a positive integer. Thus, occurrence of voids of 1000 nm² or more is prevented as much as possible, and scattering is reduced. The scattering can be further reduced by controlling the thickness within the range shown by Expression 1.

The first layer including hollow particles of the present invention can have a thickness of 80 nm or more and 200 nm or less. The reflectivity in the visible region can be reduced in both monolayer and multilayer films by designing the thickness within this range.

Method of Producing Optical Member

A method of producing an optical member of the present invention will now be described.

The method of producing an optical member of the present invention includes a first coating step of applying a first coating solution dispersing hollow particles to a substrate. The method includes a first drying step of drying the coating film of the first coating solution applied to the substrate to form a hollow particle layer having gaps between the hollow particles. In this step, a layer including hollow particles is formed on the substrate. The method includes a second coating step of applying a second coating solution containing a binder or a component for generating a binder to the hollow particle layer; a second drying step of drying the coating film of the second coating solution to form a precursor layer including the binder intervening in the gaps between the hollow particles; a third coating step of applying a third coating solution containing a fluorine compound to the precursor layer; and a forming step of drying the coating film of the third coating solution and giving the fluorine compound to the gaps of the precursor layer to form an antireflection film including a first layer including the hollow particles.

In the first coating step, only hollow particles are involved in the formation of a film, in the absence of the binder, by applying the first coating solution dispersing hollow particles to the substrate, and thereby the arrangement property of the hollow particles can be improved without receiving inhibition by the binder. The substrate used in the coating can be a glass or polymer substrate. The substrate may have any shape, such as a plane, curve, concave, convex, or film. The application of the first coating solution may be performed by any process.

The hollow particles contained in the first coating solution can have surfaces modified with, for example, methyl groups. Such hollow particles can reduce the viscosity in the form of slurry. In the case of hollow silica particles, accordingly, trifunctional silane modified with a methyl group, such as methyl triethoxy silane or methyl trimethoxy silane, can be used as a precursor for forming the walls of hollow particles. The material used as the precursor may be a mixture of trifunctional silane mentioned above and tetrafunctional silane, such as tetraethoxy silane. A composition that allows stable production of particles can be selected.

The solvent of the first coating solution can be a solvent having satisfactory affinity to the hollow particles. A solvent having low affinity to hollow particles causes aggregation of the hollow particles. The solvent of the first coating solution can have a boiling point of 100° C. or more and 200° C. or less. Examples of such solvents include 1-methoxy-2-propanol, 2-ethyl-1-butanol, methyl cellosolve, ethyl cellosolve, and butyl cellosolve, and solvent mixtures thereof.

The concentration of the hollow particles contained in the first coating solution is desirably as low as possible within the range that allows form a film having a desirable thickness. An increase in the solid content concentration increases the viscosity, decreases the arrangement property of the hollow particles, and deteriorates the dispersion state, resulting in a difficulty in formation of uniform voids in the film. The film, therefore, can be formed under conditions allowing the film to be formed with a lower solid content concentration.

In the first drying step of forming a hollow particle layer, the coating film of the first coating solution applied to the substrate is dried. The drying can be performed with, for example, a dryer, a hot plate, or an electric furnace. The drying is performed at a temperature and for a period of time that do not affect the substrate and can evaporate the organic solvent inside the hollow particles. In general, the temperature is 300° C. or less.

In the second coating step, a second coating solution containing a binder or a component for generating a binder is applied to the hollow particle layer. In the second coating step, the binder can be packed in the gaps between the hollow particles, while maintaining the arrangement property of the hollow particles. The film formed by interposing the binder in the gaps between the hollow particles can have abrasion resistance and can prevent scattering. The concentration of the binder in the second coating solution may be any concentration that gives a desired content to the film of the hollow particles and can be appropriately selected depending on the solvent and the conditions of film formation.

The solvent of the second coating solution can be appropriately selected from those having satisfactory affinity to the binder. Examples of such solvents include 1-methoxy-2-propanol, 2-ethyl-1-butanol, methyl cellosolve, ethyl cellosolve, and butyl cellosolve, and solvent mixtures thereof.

Since the application with the second coating solution is performed after the formation of the film of the hollow particles, immersion, such as dip coating, causes detachment of the hollow particles adhering to the substrate. The application may be performed by any process except immersion, and any common method using a coating solution, such as spin coating or spray coating, can be employed. From the viewpoint of detachment of hollow particles or in the light of forming a film having a uniform thickness on a substrate having a curve, such as a lens, spin coating can be employed for forming a film of the coating solution.

The second coating solution may contain solid metal oxide particles. The solid metal oxide particles can improve the abrasion resistance of the resulting film. Any particles can be used, and particles having a low refractive index, such as particles of $SiO_2$ or $MgF_2$, can be used from the viewpoint of refractive index. The metal oxide particles can have an average particle diameter of 10 nm or less.

In the second drying step of forming a first layer including hollow particles, the coating film of the applied second coating solution is dried to form a first layer including a precursor layer including the binder intervening in the gaps between the hollow particles. The drying can be performed by the same process as that for forming the hollow particle layer.

In the third coating step, a third coating solution containing a fluorine compound is applied to the precursor layer. As a result, the fluorine compound penetrates into the voids defined by the gaps between the hollow particles and the binder and can form the surfaces of the voids. The concentration of the fluorine compound in the third coating solution can be 0.04% by mass or more and 0.1% by mass or less.

If the solvent of the third coating solution has low compatibility to the fluorine compound, the intrinsic oil repellent property of the fluorine compound cannot be utilized. The solvent, accordingly, should have high compatibility to the fluorine compound, and examples of the solvent of the third coating solution include hydrofluoropolpolyethers, hydrofluoroethers, and perfluorocarbons, and solvent mixtures thereof.

In the third coating step, since the film is formed without using a mixture of the binder and the fluorine compound, the film strength due to the binder can be maintained; and since fluorine covers the surfaces of the voids, a desired degree of oil repellent property can be achieved with a small amount of the fluorine compound. As a result, the refractive index can be prevented from increasing due to the fluorine compound. A first layer including hollow particles can be formed while maintaining the oil repellent property, low refractive index, and film strength.

In the step of forming an antireflection film, the coating film of the third coating solution is dried to give the fluorine compound to the surface of the binder intervening in the gaps of the precursor layer to form an antireflection film.

In the above-described embodiment, the first layer including hollow particles is provided on the substrate 17. Alternatively, a single or multiple oxide layers may be provided on the substrate 17, and the first coating solution may be applied to the oxide layer. A high-refractive-index layer or a medium-refractive-index layer may be provided. Examples of the material of such layers include zirconium oxide, titanium oxide, tantalum oxide, niobium oxide, hafnium oxide, alumina, silica, and magnesium fluoride. These layers can be formed by, for example, vapor deposition or sputtering.

The refractive index layer and functional layers can be formed by vacuum vapor deposition, sputtering, CVD, dip coating, spin coating, or spray coating. The present invention will now be more specifically described by examples, but is not limited to the following examples within the scope of the present invention.

Example 1

In Example 1, the antireflection film of the present invention was produced by the following process and was evaluated.

First Coating Solution

A first coating solution containing hollow silica particles (solid concentration: 3.60% by mass) was prepared by diluting 6.0 g of hollow silica particles slurry IPA dispersion (Sluria 1110, manufactured by JGC C&C, average Feret's diameter: 55 nm, solid concentration: 20.50% by mass) with 28.1 g of 1-methoxy-2-propanol (Cica special grade, manufactured by Kanto Chemical Co., Inc.).

Second Coating Solution

A second coating solution containing a binder was prepared by diluting 6.0 g of an alkoxysilane hydrolysis-condensation product (Accuglass T-11 (111), manufactured by Haneywell, solid concentration: 4.50% by mass) with 39.1 g of 2-ethyl-1-butanol (EP grade, manufactured by Tokyo Chemical Industry Co., Ltd., solid concentration: 0.69% by mass).

Third Coating Solution

A third coating solution containing a fluorine compound was prepared by diluting 1.0 g of a perfluoropolyether-containing compound (Durasurf DS-1101 S135, manufactured by Harves Co., Ltd., solid concentration: 0.10% by mass) with 2.0 g of a fluorine solvent (DS-5135, manufactured by Harves Co., Ltd.).

Each solid concentration shown in the parentheses denotes the concentration in the prepared coating solution.

Film Formation

The first coating solution (0.2 mL) composed of hollow silica particles and a dispersion medium was dropped on a glass substrate LAH55 having a diameter of 39 mm and a thickness of 2 mm, and a film was formed using a spin coater at 3000 rpm for 30 seconds. The second coating solution (0.2 mL) was dropped on the coating film of the first coating solution on the substrate, and a film was formed using a spin coater at 2000 rpm for 30 seconds. The third coating solution (0.2 mL) containing a component necessary for forming a fluorine compound was further dropped, and a film was formed using a spin coater at 3000 rpm for 10 seconds. The substrate provided with the coating films was then fired at 150° C. for 2 hours to form a film. Thus, an optical member including an antireflection film on the substrate was prepared.
Evaluation The reflectivity of the optical member of Example 1 was measured with a lens reflectivity measuring apparatus (USPM-RU, manufactured by Olympus Corp.) over a wavelength of 400 to 700 nm. The refractive index of the optical member was determined from the refractive index of the substrate LAH-55 and the wavelength showing the minimum reflectivity. The initial refractive index of the optical member of Example 1 was 1.25.

The optical member was rubbed with cotton cloth (Clint, manufactured by Asahi Kasei Chemical Corp.) at a load of 300 g/cm$^2$ 20 times in a reciprocating motion, and the refractive index was then measured as in above. As a result, no variation in refractive index was observed, and no scratch was observed.

The oil contact angle measured using n-hexadecane by a θ/2 method was 61°, and the water contact angle similarly measured was 106°.

The diffusibility was evaluated by sticking human sebum to the surface of the antireflection film with plastic fibers having a tip diameter of 0.1 mm. The diameter of the stuck sebum was 157 μm. The diameter after 2 hours after the sticking of the sebum was 163 μm. The results demonstrated that discoloration by sebum was prevented compared to Comparative Example 1 described below.

Figure 3:
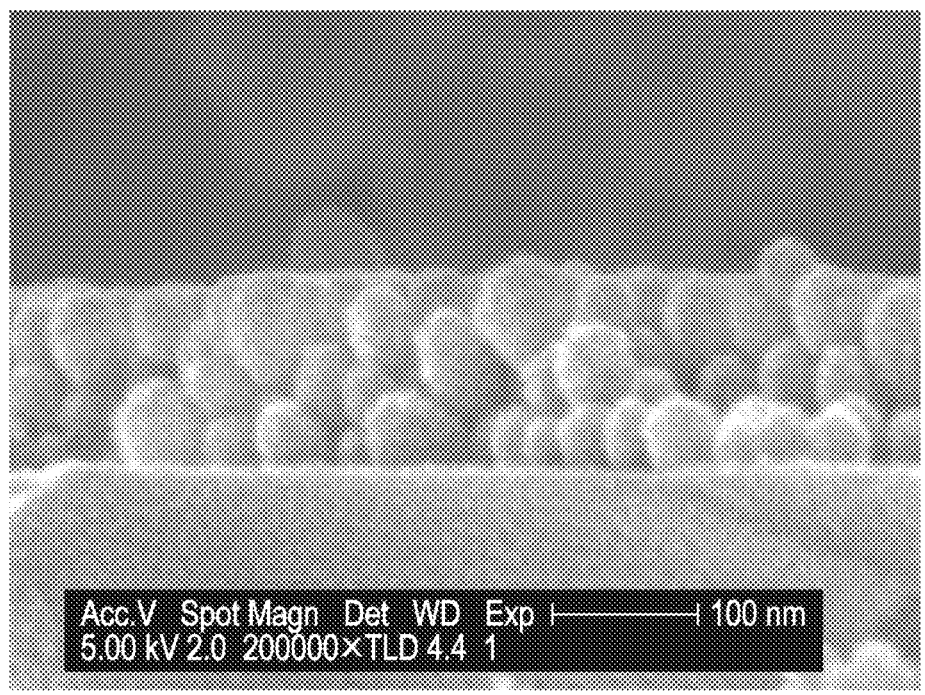
FIG. 3 is a scanning reflection electron microscopic photograph of the antireflection film of Example 1.

FIG. 3 shows a scanning reflection electron microscopic photograph of the optical member of Example 1. No fluorine compound layer was observed on the surface of the antireflection film was observed by the scanning reflection electron microscopic investigation.

Example 2

Example 2 was performed as in Example 1 except that the concentration of the fluorine compound contained in the third coating solution was varied.
Third Coating Solution A third coating solution containing a fluorine compound was prepared by diluting 1.0 g of a perfluoropolyether-containing compound (Durasurf DS-1101 S135, manufactured by Harves Co., Ltd., solid concentration: 0.10% by mass) with 2.5 g of a fluorine solvent. The solid concentration shown in the parentheses denotes the concentration in the prepared coating solution.
Evaluation Evaluation was performed as in Example 1, and the results demonstrated that the initial refractive index of the optical member of Example 2 was 1.247.

The optical member was rubbed with cotton cloth (Clint, manufactured by Asahi Kasei Chemical Corp.) at a load of 300 g/cm$^2$ 20 times in a reciprocating motion, and the refractive index was then measured as in above. As a result, no variation in refractive index was observed, and no scratch was observed.

The oil contact angle measured using n-hexadecane by a θ/2 method was 52.5°, and the water contact angle similarly measured was 103°.

The diffusibility was evaluated by sticking human sebum to the surface of the antireflection film with plastic fibers having a tip diameter of 0.1 mm. The diameter of the stuck sebum in Example 2 was 209 μm. The diameter after 2 hours after the sticking of the sebum was 263 μm.

Example 3

In Example 3, an optical member was produced and evaluated as in Example 1 except that the concentration of the fluorine compound contained in the third coating solution was varied.
Third Coating Solution As the third coating solution containing a fluorine compound, 1.0 g of a perfluoropolyether-containing compound (Durasurf DS-1101 S135, manufactured by Harves Co., Ltd., solid concentration: 0.1% by mass) was used without being diluted with a fluorine solvent. The solid concentration shown in the parentheses denotes the concentration in the prepared coating solution.
Evaluation Evaluation was performed as in Example 1, and the results demonstrated that the initial refractive index of the optical member of Example 3 was 1.259.

The optical member was rubbed with cotton cloth (Clint, manufactured by Asahi Kasei Chemical Corp.) at a load of 300 g/cm$^2$ 20 times in a reciprocating motion, and the refractive index was then measured as in above. As a result, no variation in refractive index was observed, and no scratch was observed.

The oil contact angle measured using n-hexadecane was 68.7°, and the water contact angle similarly measured was 108°.

The diffusibility was evaluated by sticking human sebum to the surface of the antireflection film with plastic fibers having a tip diameter of 0.1 mm. The diameter of the stuck sebum in Example 3 was 173 μm. The diameter after 2 hours after the sticking of the sebum was 181 μm.

Example 4

In Example 4, an optical member was produced and evaluated as in Example 1 except that the solvent of the third coating solution containing the fluorine compound was varied.
Third Coating Solution A fluorine coating solution was prepared by diluting 1.0 g of a perfluoropolyether-containing compound (Durasurf DS-1101 TH, manufactured by Harves Co., Ltd., solid concentration: 0.04% by mass) with 2.5 g of a fluorine solvent (manufactured by Harves Co., Ltd. DS-TH).
Evaluation Evaluation was performed as in Example 1, and the results demonstrated that the initial refractive index of the optical member of Example 4 was 1.25.

The optical member was rubbed with cotton cloth (Clint, manufactured by Asahi Kasei Chemical Corp.) at a load of 300 g/cm$^2$ 20 times in a reciprocating motion, and the refractive index was then measured as in above. As a result, no variation in refractive index was observed, and no scratch was observed.

The oil contact angle measured using n-hexadecane by a θ/2 method was 53.9°, and the water contact angle similarly measured was 83.3°.

The diffusibility was evaluated by sticking human sebum to the surface of the antireflection film with plastic fibers having a tip diameter of 0.1 mm. The diameter of the stuck sebum was 206 μm. The diameter after 2 hours after the sticking of the sebum was 327 μm.

Comparative Example 1

In Comparative Example 1, an optical member was produced and evaluated as in Example 1 except that the third coating solution containing the fluorine compound was not applied.
Evaluation Evaluation was performed as in Example 1, and the results demonstrated that the initial refractive index of the optical member of Comparative Example 1 was 1.25.

The optical member was rubbed with cotton cloth (Clint, manufactured by Asahi Kasei Chemical Corp.) at a load of 300 g/cm² 20 times in a reciprocating motion, and the refractive index was then measured as in above. As a result, no variation in refractive index was observed, and no scratch was observed.

The oil contact angle measured using n-hexadecane was 12°, and the water contact angle similarly measured was 93°.

The diffusibility was evaluated by sticking human sebum to the surface of the antireflection film with plastic fibers having a tip diameter of 0.1 mm. The diameter of the stuck sebum was 187 μm. The diameter discolored after 2 hours after the sticking of the sebum was 832 μm. In the portion of the discoloration due to sebum, no sebum was observed in the film surface, which demonstrated that the film itself discolored.

Comparative Example 2

In Comparative Example 2, an optical member was produced and evaluated as in Example 1 except that the concentration of the fluorine compound contained in the third coating solution was varied.
Third Coating Solution A third coating solution was prepared by diluting 1.0 g of a perfluoropolyether-containing compound (Durasurf DS-1101 S135, manufactured by Harves Co., Ltd., solid concentration: 0.1% by mass) with 5.0 g of a fluorine solvent (DS-S135, manufactured by Harves Co., Ltd.). The solid concentration shown in the parentheses denotes the concentration in the prepared coating solution.
Evaluation Evaluation was performed as in Example 1, and the results demonstrated that the initial refractive index of the optical member of Comparative Example 2 was 1.243.

The optical member was rubbed with cotton cloth (Clint, manufactured by Asahi Kasei Chemical Corp.) at a load of 300 g/cm² 20 times in a reciprocating motion, and the refractive index was then measured as in above. As a result, no variation in refractive index was observed, and no scratch was observed.

The oil contact angle measured using n-hexadecane was 31.8°, and the water contact angle similarly measured was 101°.

The diffusibility was evaluated by sticking human sebum to the surface of the antireflection film with plastic fibers having a tip diameter of 0.1 mm. The diameter of the stuck sebum was 179 μm. The diameter after 2 hours after the sticking of the sebum was 1199 μm.

Evaluation of Examples and Comparative Examples

The comparison between Examples 1 to 4 and Comparative Example 1 demonstrates that discoloration by sebum is prevented by performing the application of the third coating solution containing a fluorine compound after the formation of the hollow particle layer.

The comparison between Examples 1 to 4 and Comparative Example 2 demonstrates that the discoloration by sebum cannot be prevented when the concentration of the fluorine compound in the third coating solution is low (Comparative Example 2).

The antireflection film of the present invention can be applied to optical devices having a function of reducing the reflected light intensity at a light incident or emitting surface, for example, an image pickup apparatus, such as a camera or a video camera, or a projection apparatus, such as an optical scanning apparatus of a liquid crystal projector or electrophotographic equipment.

The present invention can provide an antireflection film and an optical member that can reduce the diffusion of contaminants.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An antireflection film comprising a layer including particles, a binder and a void,
    wherein at least a part of a surface formed by the particles and the binder and facing to the void is covered with a fluorine compound and the fluorine compound is discontinuously disposed on the surface.

2. The antireflection film according to claim 1, wherein the particles and the binder contain silica.

3. The antireflection film according to claim 1, wherein the particles are hollow particles.

4. The antireflection film according to claim 1, wherein an average diameter of the particles is 15 nm or more and 100 nm or less.

5. The antireflection film according to claim 1, wherein the layer has a contact angle between a surface of the layer and water of 80° to 120°.

6. The antireflection film according to claim 1, wherein the fluorine compound is a perfluoropolyether-containing compound or TEFLON.

7. The antireflection film according to claim 1, further comprising an oxide layer.

8. The antireflection film according to claim 1, wherein the oxide layer contains a silicon oxide or a metal oxide.

9. The antireflection film according to claim 1, wherein the layer has a refractive index of 1.22 to 1.30.

10. The antireflection film according to claim 9, wherein the layer has a contact angle between a surface of the layer and n-hexadecane of 50° to 70°.

11. A member comprising:
    a substrate; and
    an antireflection film provided on the substrate,
    wherein the antireflection film comprises a layer including particles, a binder and a void, and
    wherein at least a part of a surface formed by the particles and the binder and facing to the void is covered with a fluorine compound and the fluorine compound is discontinuously disposed on the surface.

12. The member according to claim 11, wherein the particles and the binder contain silica.

13. The member according to claim 11, wherein the particles are hollow particles.

14. The member according to claim 11, wherein the layer has a contact angle between a surface of the layer and water of 80° to 120°.

15. The member according to claim 11, wherein the fluorine compound is a perfluoropolyether-containing compound or TEFLON.

16. The member according to claim 11, wherein the layer has a refractive index of 1.22 to 1.30.

17. The member according to claim 16, wherein the layer has a contact angle between a surface of the layer and n-hexadecane of 50° to 70°.

18. The member according to claim 11, wherein the antireflection film further comprises an oxide layer on the substrate side of the layer.

19. The member according to claim 18, wherein the oxide layer contains a silicon oxide or a metal oxide.

20. The member according to claim 18, wherein the oxide layer comprises a plurality of oxide layers having refractive indexes different from each other.

21. The member according to claim 18, wherein the substrate is a glass substrate.

22. A member comprising:
a substrate; and
an antireflection film provided on the substrate,
wherein the antireflection film comprises a layer including particles, a binder and a void, and
wherein a fluorine compound is discontinuously disposed on a surface of the layer on a side opposite to the substrate.

23. The member according to claim 22, wherein at least a part of a surface formed by the particles and the binder and facing to the void is covered with the fluorine compound and the fluorine compound is discontinuously disposed on the surface formed by the particles and the binder and facing to the void.

24. The member according to claim 23, wherein the layer has a refractive index of 1.22 to 1.30.

25. The member according to claim 24, wherein the particles and the binder contain silica.

26. The member according to claim 25, wherein the particles are hollow particles.

27. The member according to claim 26, wherein the layer has a contact angle between a surface of the layer and water of 80° to 120°.

28. The member according to claim 27, wherein the fluorine compound is a perfluoropolyether-containing compound or TEFLON.

29. The member according to claim 27, wherein the antireflection film further comprises an oxide layer on a substrate side of the layer.

30. The member according to claim 29, wherein the oxide layer contains a silicon oxide or a metal oxide.

31. The member according to claim 30, wherein the oxide layer comprises a plurality of oxide layers having refractive indexes different from each other.

32. The member according to claim 31, wherein the substrate is a glass substrate.

* * * * *